E. A. HALBLEIB.
ELECTRIC SYSTEM FOR AUTOMOBILES.
APPLICATION FILED OCT. 9, 1911.
1,116,883.
Patented Nov. 10, 1914.
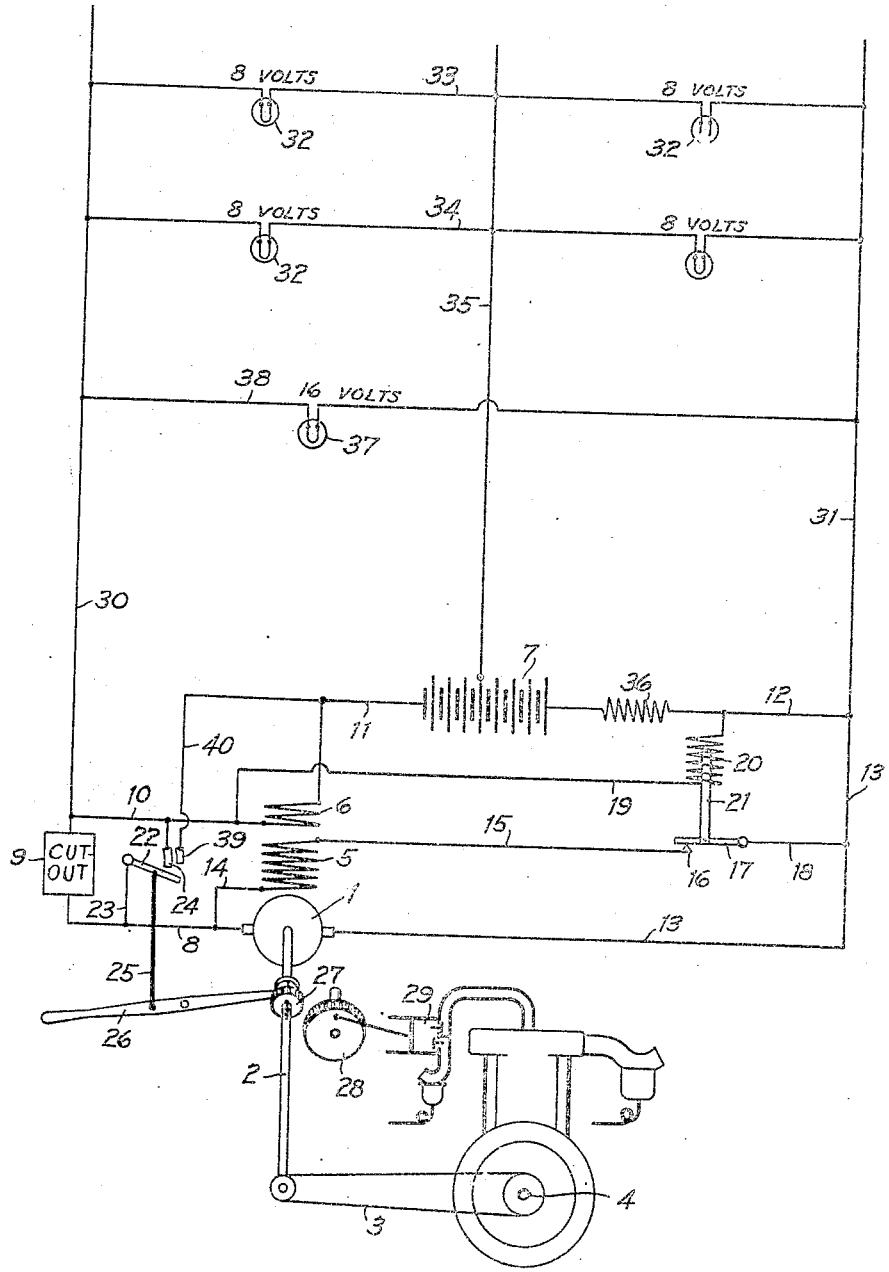
Witnesses:
Clarence W. Carroll
L. Thon
Inventor:
Edward A. Halbleib
by his attorneys
Osgood, Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM FOR AUTOMOBILES.

1,116,8 3.  Specification of Letters Patent.  Patented Nov. 10, 1914.

Application filed October 9, 1911. Serial No. 653,670.

*To all whom it may concern:*

Be it known that I, EDWARD A. HALBLEIB, a citizen of the United States, and resident of Rochester, in the county of Monroe and State of New York, have invented certain new and useful Improvements in Electric Systems for Automobiles, of which the following is a specification.

This invention relates to electric systems of the three-wire type, particularly to systems such as are used upon automobiles wherein a dynamo-electric machine is employed, alternately, as a generator to charge a storage-battery and provide current for illumination and other purposes, and as a motor, energized by current from a storage-battery, to provide power for starting the engine of the vehicle.

In a system of the kind in question it is common to employ a differentially-wound generator having a series opposition field-winding, the storage-battery being connected in series with this field-winding and with the armature of the generator. It is also preferable in such a system to employ the three-wire type of distribution to the electric lights of the vehicle, employing three main conductors, of which two extend from the terminals of the generator-armature, while the third extends from the central electrode or point of neutral E. M. F. in the battery.

In an arrangement such as that just referred to the series field-winding of the generator is interposed between one of the battery-terminals and the corresponding main conductor of the distributing circuit. Accordingly, when the battery is providing current for energizing the electric lights, it will be apparent that the resistance of this field-winding tends to unbalance the three-wire system, so as to cause a greater flow of current in the other branch of the three-wire circuit, and thus an unequal discharging of the two halves of the battery.

The object of the present invention is to avoid this unbalanced action in the system, and to this end I propose to introduce, at the opposite side of the battery from the series field-winding of the generator, a coil or other suitable resistance-device having resistance substantially equal to that of the field-winding in question, so as to restore the balance of the system.

The invention is illustrated as applied to a system in which the same dynamo electric machine is employed as a generator, when the engine of the vehicle is normally operating, and as a motor by which power may be furnished to start the operation of the engine. The armature 1 of the generator is connected with a shaft 2, and this shaft is connected, by means such as a belt or chain 3, with the shaft 4 of the engine. The generator has a shunt field-winding 5, and an opposition field-winding 6, and it is employed in connection with a storage-battery 7, which is floated upon the line, that is to say, is connected to the terminals both of the generator and of the lighting-circuit.

Referring particularly to the diagram, in charging the battery the armature 1 is actuated by power derived from the engine-shaft, and current then flows from the armature through a wire 8 to a reverse-current cut-out 9, and thence, through a wire 10, to the opposition field-winding 6. From this winding the current flows, through a wire 11, to and through the storage-battery 7, thus charging the battery, and the current returns through wires 12 and 13 to the armature 1. At the same time the field-winding 5 is energized by current flowing from the wire 8, through a wire 14, through the winding 5, and thence through a wire 15, a fixed contact 16, a contact-finger 17, and a wire 18, to the return-wire 13, and thence back to the armature.

The cut-out 9 is a device for preventing return-flow of current to the armature from the battery when the generator is at rest, thus normally preventing waste of current when the vehicle is not in use. As such devices are well known and are frequently used for this purpose, the construction of the cut-out is not illustrated or described herein.

The opposition field-winding 6 is employed in a well-known manner to regulate the generator. As above stated, the current by which the storage-battery is charged flows through this winding, and as the winding is arranged in the opposite sense from the main field-winding 5, the current flowing in the opposition-winding and through the battery tends, as it increases, to cut down the strength of the field of the generator, thus automatically limiting the electromotive force and the flow of current through the storage-battery. This arrangement in itself is not novel, and is not claimed herein.

The fixed contact 16 and contact-finger 17 constitute parts of a device for automatically interrupting the charging-current when the battery has been fully charged. The contact-finger is connected with, and actuated by, a core 21 coöperating with a solenoid 20. This solenoid is constantly energized by a current of slight amplitude flowing from the battery through the wire 11, the opposition field-winding 6 and wires 10 and 19 to the solenoid, and thence, through the wire 12, back to the battery. Accordingly as the E. M. F. increases it finally reaches a point corresponding to a full charge in the battery, at which point the magnetic force of the solenoid is sufficient to raise the core 21 and the contact-finger, thus disengaging the latter from the fixed contact 16 and deënergizing the field-winding 5, whereupon the generator ceases to supply current to charge the battery. This arrangement in itself is not novel, and is not claimed as a part of the present invention.

To cause the generator above described to operate as a motor, it is necessary to provide for a return-flow of current from the battery through the generator, and in a copending application filed July 8, 1910, Serial No. 571,099, I have disclosed an arrangement in which this is accomplished by short-circuiting the cut-out. The same arrangement is employed in the present instance. A wire 23 extends from the wire 8 to a movable contact-finger 22, which is adapted to engage a fixed contact 24 connected with the wire 10. The contact-finger is connected, by a rod 25, with a manually-operable lever 26, and when this lever is raised the contact-finger is caused to engage said fixed contact, thus closing a short-circuit around the cut-out, and thereupon the armature 1 immediately rotates, thus rotating the shaft 2 and transmitting power to the engine-shaft by which the engine may be started.

For the purpose of short-circuiting the opposition-winding 6 after the generator has started in operation as a motor a second fixed contact 39 is provided, this contact being connected, through a wire 40, with the wire 11. The contact 39 is shorter than the contact 24 so as to be engaged after the latter by the continued movement of the contact-finger, and the contact-finger thus acts first to throw the two field-windings in series and then to short-circuit the opposition-winding, thus reducing the effective number of turns and the resistance of the field-winding.

The power of the generator may be further employed, as, for example, to compress air or, as in my said application, to force combustible mixture into the engine-cylinder, and I have illustrated means for this purpose comprising a pinion splined upon the shaft 2 and engaged by the lever 26, a gear 28 journaled adjacent to, but normally out of engagement with, the pinion 27, and an air-pump 29 actuated by a connecting-rod pivoted to the gear 28. When the lever 26 is shifted as above described it carries the pinion 27 into engagement with the gear 28, and accordingly the air-pump is actuated, and it operates to draw air from a suitable carbureter and force it into the cylinder. This arrangement constitutes, in itself, no part of the present invention and is not claimed herein.

A feature of the invention resides in the connection of the lighting-circuits with the parts already described. In the drawing I have illustrated lamps 32, which may be ordinary incandescent lamps of low-voltage; eight volts, for example, being a commercial type which may be conveniently used. These lamps are arranged in two series of two lamps each, one series being connected by a wire 33, and the other series by a wire 34. The wires 33 and 34 extend between the main conductors 30 and 31, which are connected with the respective poles of the storage-battery 7.

The lamps are illustrated in pairs, because this is the manner in which they are ordinarily used, one lamp of each pair being employed in one of the side-lights of the automobile, and the other lamp in the other corresponding side-light. It is obvious that in this arrangement the extinction of one lamp of a pair, through breakage of its filament or other internal cause, would ordinarily result in the extinction of both lamps in series, if these lamps were connected in the usual manner. As this would be a serious defect, however, in an automobile lighting system, I employ a neutral conductor 35 which is connected with each of the wires 33 and 34 between the lamps fed by said wires, being thus at a point of substantial neutral E. M. F.; and this conductor extends back to the storage-battery and is there connected to a pole midway between the terminals of the battery, and thus at a point of neutral E. M. F. in the battery.

When all of the lamps 32 are burning there is no substantial flow of current in the conductor 35, but the full E. M. F. of the battery is employed in energizing the lamp circuits, the voltage of each lamp-circuit corresponding to the voltage of the entire battery. If, however, either of the lamps 32 be extinguished, thus breaking the circuit at that point, the other lamp normally in series therewith continues to operate, for current then begins to flow through a new circuit including said lamp, and supplied through the conductor 35 and one of the main wires 30 and 31. This new circuit is energized by only one-half of the storage-battery, so that the voltage corresponds to that of the single lamp. Upon the accidental extinction of one of the side lights of the automobile, therefore the corresponding side-light continues to burn, thus avoiding the complete darkness which would result if both lights were extinguished.

Owing to the interposition of the opposition-winding 6 between one terminal of the battery and the corresponding main wire 30, it may be preferable to interpose a certain amount of resistance in the conductor 12 to compensate for the resistance of the winding 6, which is not felt when current is flowing through the local circuit including the wires 35, 31, 12, and the right-hand branch of one or both of the lamp-circuits. Accordingly, a resistance-coil or equivalent device 36 is illustrated as employed for this purpose.

It will be understood that the specific voltages attributed to the several parts of the apparatus in the illustrated embodiment of the invention are selected for purposes of illustration, and that other voltages may be employed in this connection.

In the case of lamps employed otherwise than as the side-lights of the automobile, as, for example, in the interior of the vehicle, it is not always desirable to employ lamps with low voltage; in fact, lamps of higher voltage may be preferable, and such lamps may be connected across the main wires 30 and 31, as in the case of the lamp 37 illustrated as so connected by means of a wire 38.

I claim:—

In a three-wire electric system, the combination, with a differentially-wound generator, a storage-battery in series with the armature and the series-winding of the generator, and main conductors extending, respectively, from the opposite terminals of the armature and the point of neutral E. M. F. in the battery, of a resistance-device interposed between one battery-terminal and the corresponding armature-terminal, to balance the resistance of the series-winding on the opposite side of the battery.

EDWARD A. HALBLEIB.

Witnesses:
 L. THON,
 D. GURNEE.